(12) United States Patent
Yuan

(10) Patent No.: US 10,015,787 B2
(45) Date of Patent: Jul. 3, 2018

(54) METHOD FOR SELECTING CONSECUTIVE RESOURCE BLOCKS AND ASSOCIATED BASE STATION

(71) Applicant: Telefonaktiebolaget L M Ericsson (publ), Stockholm (SE)

(72) Inventor: Yi Yuan, Jiangsu (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 287 days.

(21) Appl. No.: 14/778,682

(22) PCT Filed: Mar. 27, 2013

(86) PCT No.: PCT/CN2013/073272
§ 371 (c)(1),
(2) Date: Sep. 21, 2015

(87) PCT Pub. No.: WO2014/153738
PCT Pub. Date: Oct. 2, 2014

(65) Prior Publication Data
US 2016/0050651 A1 Feb. 18, 2016

(51) Int. Cl.
*H04W 72/04* (2009.01)
*H04L 12/807* (2013.01)
(Continued)

(52) U.S. Cl.
CPC ......... *H04W 72/044* (2013.01); *H04L 5/0044* (2013.01); *H04L 5/0064* (2013.01);
(Continued)

(58) Field of Classification Search
CPC . H04W 72/04; H04W 28/0278; H04W 72/06; H04W 72/10; H04W 72/1247; H04L 5/0023; H04L 5/003
See application file for complete search history.

(56) References Cited

U.S. PATENT DOCUMENTS

2006/0285515 A1* 12/2006 Julian .................. H04W 72/12
370/328
2009/0190554 A1 7/2009 Cho
(Continued)

FOREIGN PATENT DOCUMENTS

CN 102271102 A 12/2011
CN 102907156 A 1/2013

OTHER PUBLICATIONS

PCT Notification of Transmittal of the International Search Report and the Written Opinion of the International Searching Authority, or the Declaration for International application No. PCT/CN2013/073272, dated Jan. 2, 2014.
ETSI TS 136 211 V11.0.0; Technical Specification; LTE; Evolved Universal Terrestrial Radio Access (E-UTRA); Physical channels and modulation (3GPP TS 36.211 version 11.0.0 Release 11), Oct. 2012.
ETSI TS 136 212 V11.0.0; Technical Specification; LTE; Evolved Universal Terrestrial Radio Access (E-UTRA); Multiplexing and channel coding (3GPP TS 36.212 version 11.0.0 Release 11), Oct. 2012.
ETSI TS 136 213 V11.0.0; Technical Specification; LTE; Evolved Universal Terrestrial Radio Access (E-UTRA); Physical layer procedures (3GPP TS 36.213 version 11.0.0 Release 11), Oct. 2012.

*Primary Examiner* — Charles Appiah
*Assistant Examiner* — Edward Zhang
(74) *Attorney, Agent, or Firm* — Baker Botts, LLP

(57) ABSTRACT

The present disclosure discloses a method for selecting consecutive resource blocks (RBs) on an available frequency band and an associated base station (BS). The method comprises the step of determining a minimum possible window size and a maximum possible window size for each of selected fragments of the frequency band (S210), wherein all RBs on a selected fragment together are sufficient to empty a transmission buffer. The method further comprises the step of determining candidate fragments to be searched through (S220), by defining a reference window size range by a minimum value of minimum possible window sizes of the selected fragments and a minimum value of maximum possible window sizes of the selected fragments and determining a selected fragment, whose window size range defined by its minimum possible window size and maximum possible window size intersects with the reference window size range, as one of the candidate fragments. The method also comprises the step of searching (Continued)

through the candidate fragments using window sizes which fall within the reference window size range to select a minimum number of consecutive RBs sufficient to empty data stored in the transmission buffer (S240).

14 Claims, 10 Drawing Sheets

(51) Int. Cl.
    *H04W 72/12*     (2009.01)
    *H04L 5/00*     (2006.01)

(52) U.S. Cl.
    CPC ............ *H04L 47/27* (2013.01); *H04L 5/0007* (2013.01); *H04W 72/1252* (2013.01)

(56) References Cited

U.S. PATENT DOCUMENTS

| | | |
|---|---|---|
| 2012/0250558 A1 | 10/2012 | Chung et al. |
| 2014/0101177 A1* | 4/2014 | Saito ................. G06F 17/30303 707/755 |
| 2015/0223178 A1* | 8/2015 | Pietraski ................. H04L 5/001 370/252 |

* cited by examiner

METHOD FOR SELECTING CONSECUTIVE RESOURCE BLOCKS AND ASSOCIATED BASE STATION

PRIORITY

This nonprovisional application is a U.S. National Stage Filing under 35 U.S.C. § 371 of International Patent Application Serial No. PCT/CN2013/073272, filed Mar. 27, 2013, and entitled "METHOD FOR SELECTING CONSECUTIVE RESOURCE BLOCKS AND ASSOCIATED BASE STATION."

TECHNICAL FIELD

The present disclosure generally relates to the technical field of mobile communication systems, and particularly, to a method for selecting consecutive resource blocks (RBs) on an available frequency band and an associated base station (BS).

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

To combat the frequency selective fading phenomenon which is common in mobile communications, a so called frequency selective scheduling (FSS) technique is widely used in mobile communication systems including recent LTE systems. The fundament principle of the FSS technique is to selectively use radio resource units (e.g., RBs in LTE systems) associated with non-faded or less-faded frequencies for data transmission, so that the data transmission is carried out using only radio resource units of high quality and is thus significantly improved in both reliability and efficiency.

The FSS technique can be applied for both downlink (DL) and uplink (UL) transmissions in LTE systems, but is subject to different constraints and accordingly aims at different targets.

Specifically, in the downlink direction, as an eNB typically has inexhaustible power supply and adequate processing power, distributed RBs can be allocated for downlink transmission. Thus, with respect to the DL FSS, it is always preferable for the eNB to preferentially select RBs, individually having the best qualities, for downlink transmission to a User Equipment (UE), regardless of the frequencies that the RBs are associated with (namely, the positions of the RBs in the frequency dimension). In this way, all data stored in the transmission buffer of the eNB can be transmitted to the UE using the minimum amount of RBs in a buffer limited case (to be set forth in additional detail hereinbelow), or the most data stored in the transmission buffer can be transmitted to the UE in an RB limited case (to be set forth in additional detail hereinbelow).

On the other hand, in the uplink direction, as a UE is typically limited in power supply and processing power, RBs must be allocated consecutively for uplink transmission to reduce Peak to Average Power Ratio (PAPR) and hence to reduce power consumption of the UE. Under such a constraint, with respect to the UL FSS, it is preferable for the eNB to select a group of consecutive RBs, collectively having the best quality, for uplink transmission from the UE. In this way, all data stored in the transmission buffer of the UE can be transmitted to the eNB using the minimum amount of consecutive RBs in the buffer limited case, or the most data stored in the transmission buffer can be transmitted to the eNB in the RB limited case.

The quality of an RB can be measured in terms of Signal to Interference plus Noise Ratio (SINR), Signal to Noise Ratio (SNR), number of Effective Raw Bits (ERBs), or any other index which may quantify the quality of a RB. As used herein, the term "ERB" refers to raw bits that can be decoded correctly from an RB and, in other words, effectively conveyed by the RB.

Using the number of ERBs to assess the quality of RB, the target for UL FSS can be reworded as selecting a group of consecutive RBs, having the largest total number of ERBs, for uplink transmission from the UE.

To this end, it is necessary to jointly select the number of RBs constituting the group of consecutive RBs and the positions of the consecutive RBs. Although many prior art technical solutions have been proposed for UL FSS, none of them makes such a joint selection.

Instead, according to a first typical solution (hereinafter denoted as solution 1) known as peak RB expansion, one RB of the best quality is initially selected and then RBs adjoining the selected RB are selected iteratively until a group of consecutive RBs sufficient to empty the transmission buffer is formed or there is no more RB available.

According to a second typical solution (hereinafter denoted as solution 2), the size of the group is initially decided for example through theoretical calculation, model simulation or experientially, and then the entire set of available RBs is searched through using a sliding window, whose size is equal to the decided group size, to find a group of consecutive RBs having the largest total number of ERBs or just sufficient to empty the transmission buffer.

FIG. 1 gives an example of the groups of consecutive RBs selected according to both the above solutions. As illustrated, the group of RBs 19-23 selected by using solution 1 contains the $22^{nd}$ RB, which has the largest number of ERBs. However, this group of RBs as a whole does not have the largest total number of ERBs. The group of RBs 3-7 selected by using solution 2 contains the largest total number of ERBs for a window size of 5 RBs. However, the transmission buffer may accommodate only an amount of data which can be carried just by RBs 4-7. Thus, without jointly selecting size and position of the group of consecutive RBs, neither solution 1 or 2 provides the optimal result for UL FSS (i.e., the minimum amount of consecutive RBs sufficient to empty the transmission buffer).

In other aspects, none of the existing solutions for UL FSS takes into account fragmentation of an available frequency band. However, even when the $1^{st}$ UE is scheduled, the frequency band may already be split into several fragments. Without considering this, solution 1 may choose a non-optimal fragment containing the RB having largest number of ERBs, whereas solution 2 may decide a group size larger than any fragment.

Additionally, all existing solutions for UL FSS assume a buffer size limited case where the transmission buffer can be emptied by available RBs. In this case, the optimal goal of UL FSS is to select the minimum amount of consecutive RBs from the available RBs for empting the transmission buffer. However, in practical scenarios, a RB limited case where the transmission buffer cannot be emptied by available RBs is also very common. In this case, the optimal goal of UL FSS is to select all RBs on the fragment which can carry the largest amount of ERBs. Without distinguishing the RB limited case from the buffer size limited case and adaptively changing the optimal goal of UL FSS, it is impossible to flexibly reduce the complexity of making the joint selection, and the optimal result for the PB limited case may not be obtained.

SUMMARY

An object of the present disclosure is to obviate at least some of the above disadvantages by providing a novel method for selecting consecutive RBs on an available frequency band and an associated BS.

According to a first aspect of the disclosure, there is provided a method for selecting consecutive RBs on an available frequency band. The method comprises the step of determining a minimum possible window size and a maximum possible window size for each of selected fragments of the frequency band. All RBs on each of the selected fragments together are sufficient to empty a transmission buffer. The method further comprises the step of determining candidate fragments to be searched through, by defining a reference window size range by a minimum value of minimum possible window sizes of the selected fragments and a minimum value of maximum possible window sizes of the selected fragments and determining a selected fragment, whose window size range defined by its minimum possible window size and maximum possible window size intersects with the reference window size range, as one of the candidate fragments. The method also comprises the step of searching through the candidate fragments using window sizes which fall within the reference window size range to select a minimum number of consecutive RBs sufficient to empty data stored in the transmission buffer.

According to a second aspect of the disclosure, there is provided a BS which comprises a possible window size determination unit, a candidate fragment determination unit, and a RB selection unit. The possible window size determination unit is configured to determine a minimum possible window size and a maximum possible window size for each of selected fragments of the frequency band. All RBs on each of the selected fragments together are sufficient to empty a transmission buffer. The candidate fragment determination unit is configured to determine candidate fragments to be searched through, by defining a reference window size range by a minimum value of minimum possible window sizes of the selected fragments and a minimum value of maximum possible window sizes of the selected fragments and determining a selected fragment, whose window size range defined by its minimum possible window size and maximum possible window size intersects with the reference window size range, as one of the candidate fragments. The RB selection unit is configured to search through the candidate fragments using window sizes which fall within the reference window size range to find and select a minimum number of consecutive RBs sufficient to empty the transmission buffer.

By using the method and BS according to the first and second aspects of the disclosure, both the optimal size and the optimal position of the group of RBs can be determined for the buffer limited case; and the searching space for the buffer limited case, specified by the fragments to be searched through and the window sizes to be used for searching, can be remarkably reduced. Accordingly, the optimal result for UL FSS can be not only accurately but also efficiently obtained in at least the buffer limited case.

BRIEF DESCRIPTION OF THE DRAWINGS

The above and other objects, features, and advantages of the present disclosure will become apparent from the following descriptions on embodiments of the present disclosure with reference to the drawings, in which.

DETAILED DESCRIPTION OF EMBODIMENTS

Hereinafter, the present disclosure is described with reference to embodiments shown in the attached drawings. However, it is to be understood that those descriptions are just provided for illustrative purpose, rather than limiting the present disclosure. Further, in the following, descriptions of known structures and techniques are omitted so as not to unnecessarily obscure the concept of the present disclosure.

Note that although terminology from 3GPP Long Term Evolution (LTE) has been used in this disclosure to exemplify the disclosure, this should not be seen as limiting the scope of the disclosure to only the aforementioned system. Other wireless systems, including Wideband Code Division Multiple Access (WCDMA), Worldwide Interoperability for Microwave Access (WiMax), Ultra Mobile Broadband (UMB) and Global System for Mobile Communications (GSM) may also benefit from exploiting the ideas covered within this disclosure.

Also, as will be appreciated by those skilled in the art, the proposed solutions are not limited to be applied for UL FSS, but can be applied for DL FSS in case continuous RBs are intended to be used for DL transmission. Further, it will be appreciated that the proposed solutions can be implemented in connection with any other RB quality index, although the number of ERBs is used here for illustrative purpose only.

Figure 1:
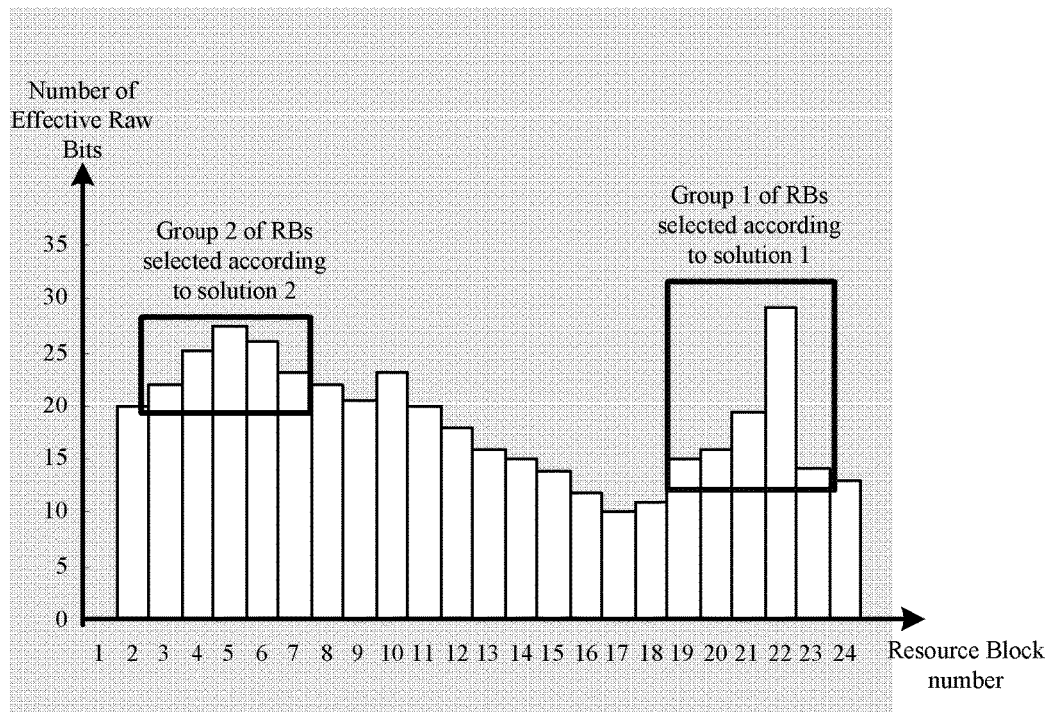
FIG. 1 is a diagram schematically illustrating non-optimal groups of consecutive RBs selected according to prior art RB selection methods.
Figure 2:
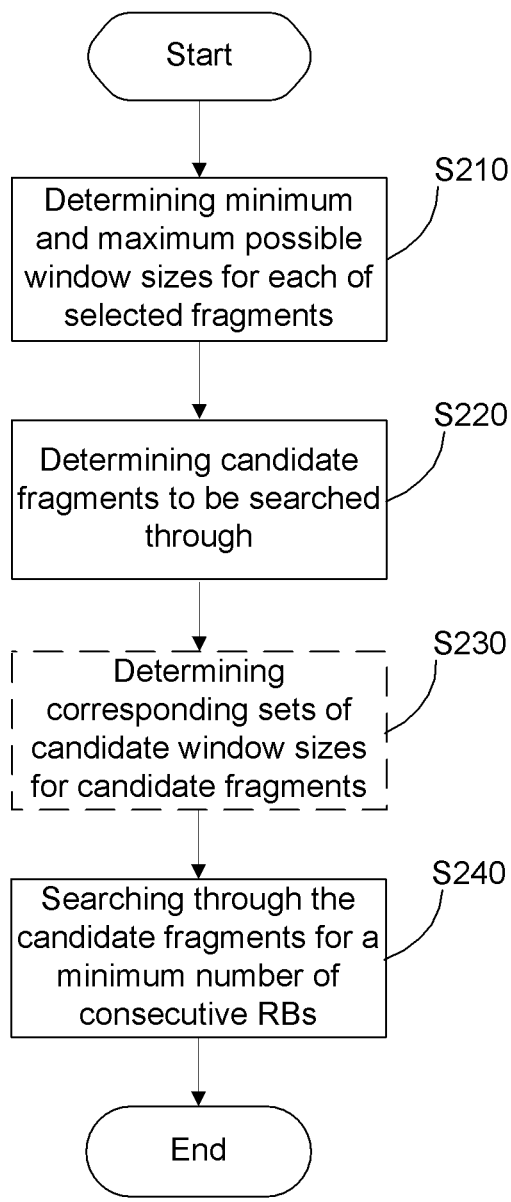
FIG. 2 is a flowchart schematically illustrating an example method for selecting consecutive RBs according to the present disclosure.

FIG. 2 schematically illustrates an example method for selecting consecutive RBs according to one embodiment of the disclosure. As illustrated, initially, a minimum possible window size and a maximum possible window size are determined for each of selected fragments of an available frequency band (S210). On each of the selected fragments, all RBs together are sufficient to empty the transmission buffer.

As used herein, the expression "sufficient to empty the transmission buffer" means that the total amount of data which can be effectively conveyed by the RBs in question is larger than the size of the transmission buffer.

Figure 5:
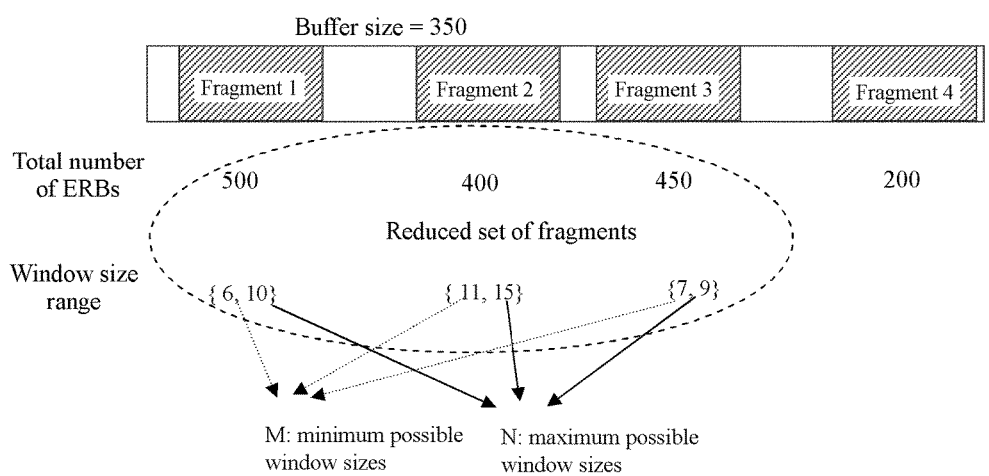
FIG. 5 is a diagram schematically illustrating an example of an intermediate result of the method for selecting consecutive RBs shown in FIG. 2.
Figure 6:
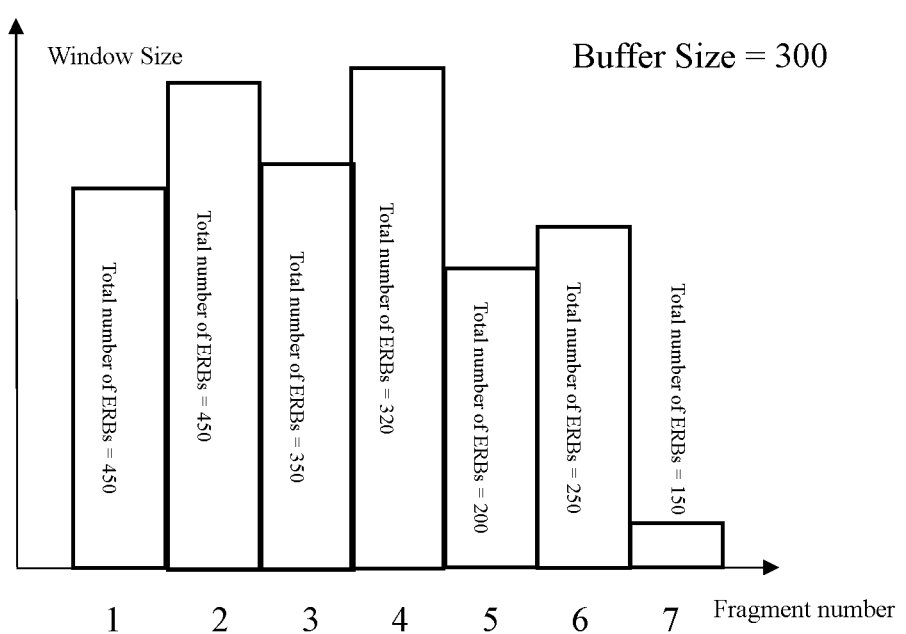
FIG. 6 is a diagram schematically illustrating all fragments of an available frequency band and their total numbers of ERBs.
Figure 7:
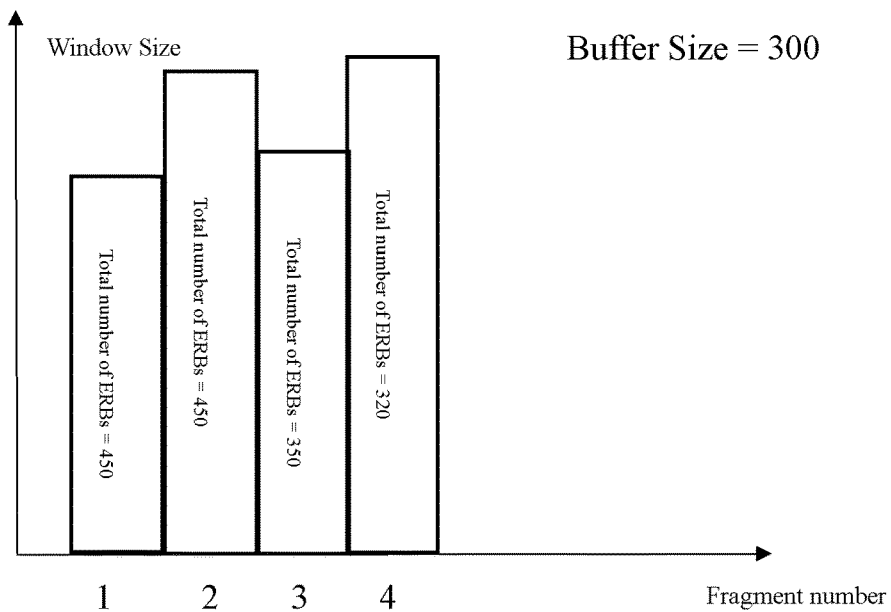
FIG. 7 is a diagram schematically illustrating selected fragments whose total numbers of ERBs are larger than the buffer size.

Straightforwardly, the RBs can be determined as sufficient to empty the transmission buffer, if the total number of ERBs available from the RBs is larger than the size of the transmission buffer. However, as will be appreciated by those skilled in the art, SINR, SNR or any other RB quality measuring index can be used instead of the number of EBRs to determine whether the RBs are sufficient to empty the transmission buffer, for example, by referring to a table showing the mapping relationship between the number of ERBs and the RB quality measuring index that is used, To promote a better understanding, an example of the result obtained by executing step S210 is given in FIG. 5. As illustrated, among fragments 1-4 of the frequency band respectively having 500, 400, 450 and 200 ERBs, only fragments 1-3 whose total numbers of ERBs are larger than the buffer size 300 are selected for determining a minimum possible window size and a maximum possible window size, whereas fragment 4 whose total number of ERBs is smaller than the buffer size is filtered out. In this manner, fragments to be searched through for selecting the minimum amount of consecutive RBs sufficient to empty the transmission buffer can be preliminary reduced, and the complexity of the overall selection process can be reduced accordingly.

The minimum possible window size corresponds to a potential minimum amount of consecutive RBs sufficient to empty the transmission buffer, and can be determined as the number of RBs with the best qualities which are sufficient to empty the transmission buffer. The maximum possible window size corresponds to a possible maximum amount of consecutive RBs sufficient to empty the transmission buffer, and can be determined as the number of RBs with the worst qualities which are sufficient to empty the transmission buffer. In an embodiment where the number of ERBs is used to measure the quality of RB, the minimum possible window size can be determined as the number of RBs with the most ERBs which are sufficient to empty the transmission buffer, and the maximum possible window size can be determined as the number of RBs with the least ERBs which are sufficient to empty the transmission buffer.

Likewise, the minimum possible window size and the maximum possible window size can be determined if SINR, SNR or any other RB quality measuring index is used, for example, by referring to a table showing the mapping relationship between the number of ERBs and the RB quality measuring index that is used.

Referring again to FIG. 5, for fragments 1-3, the minimum possible window sizes are respectively determined as 6, 11, and 7, and the maximum possible window sizes are respectively determined as 10, 15 and 9.

After step S210, candidate fragments to be searched through are determined, by defining a reference window size range by a minimum value of minimum possible window sizes of the selected fragments and a minimum value of maximum possible window sizes of the selected fragments, and determining a selected fragment, whose window size range defined by its minimum possible window size and maximum possible window size intersects with the reference window size range, as one of the candidate fragments (S220).

Optionally, after step S220, an intersection, between the reference window size range and a window size range defined by a minimum possible window size and a maximum possible window size of each of the candidate fragments, may be determined as a set of candidate window sizes corresponding to the candidate fragment (S230).

Immediately after step S220, the candidate fragments may be searched through using window sizes which fall within the reference window size range to select a minimum number of consecutive RBs sufficient to empty data stored in the transmission buffer (S240). After step S240, the process is terminated.

If the optional step S230 is executed, each of the candidate fragments is preferably searched through using the set of candidate window sizes corresponding to the candidate fragment at step S240.

In the following, the above steps will be explained in further detail in connection with FIGS. 6-9.

Corresponding to what is shown in FIG. 5, FIGS. 6-8 respectively illustrate all fragments of the available frequency band and their total numbers of ERBs, the selected fragments whose total numbers of ERBs are larger than the buffer size, and the minimum and maximum possible window sizes determined for each of selected fragments.

Figure 8:
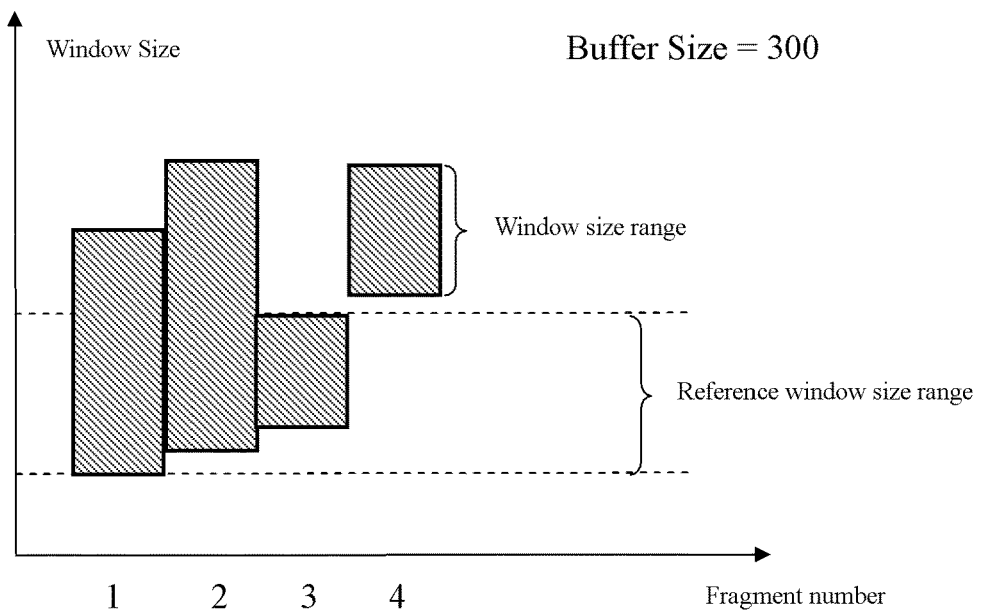
FIG. 8 is a diagram schematically illustrating minimum and maximum possible window sizes determined for each of selected fragments as well as a reference window size range.

FIG. 8 also illustrates the reference window size range obtained at step S220. Supposing the minimum and maximum possible window sizes of fragments 1-4 are respectively {2, 12}, {3, 15}, {4, 10}, {11, 15}, the reference window size range can be calculated as [min {2, 3, 4, 11}, min {12, 15, 10, 15}]=[2, 10].

As the window size ranges [2, 12], [3, 15] and [4, 10] of fragments 1-3 insect with the reference window range [2, 10] whereas the window size range [11, 15] of fragment 4 does not insect with the reference window size range, only fragments 1-3 are determined at step S220 as candidate fragments to be searched through. In this manner, fragments to be searched through for selecting the minimum amount of consecutive RBs sufficient to empty the transmission buffer can be further reduced, and the complexity of the overall selection process can be further reduced accordingly.

Subsequently, the searching step S240 may be executed, wherein the candidate fragments 1, 2, 3 are searched through using window sizes 2, 3, 4, 5, 6, 7, 8, 9 and 10 which fall within the reference window size range [2, 10] to select a minimum number of consecutive RBs sufficient to empty data stored in the transmission buffer.

As a straightforward manner to implement the searching step S240, all candidate fragments are firstly searched through using a window size equal to the upper bound of the reference window size range. If at least one group of consecutive RBs sufficient to empty the transmission buffer can be found in the current searching loop, the window size is decremented by 1 and then used to execute the next searching loop. If no group of consecutive RBs sufficient to empty the transmission buffer can be found in the current searching loop while the lower bound of the reference window size range is not reached, the group of consecutive RBs found in the last searching loop is selected as the searching result. If a group of consecutive RBs sufficient to empty the transmission buffer can be found in the current searching loop while the lower bound of the reference window size range is reached, the group of consecutive RBs found in the current searching loop is selected as the searching result.

Figure 9:
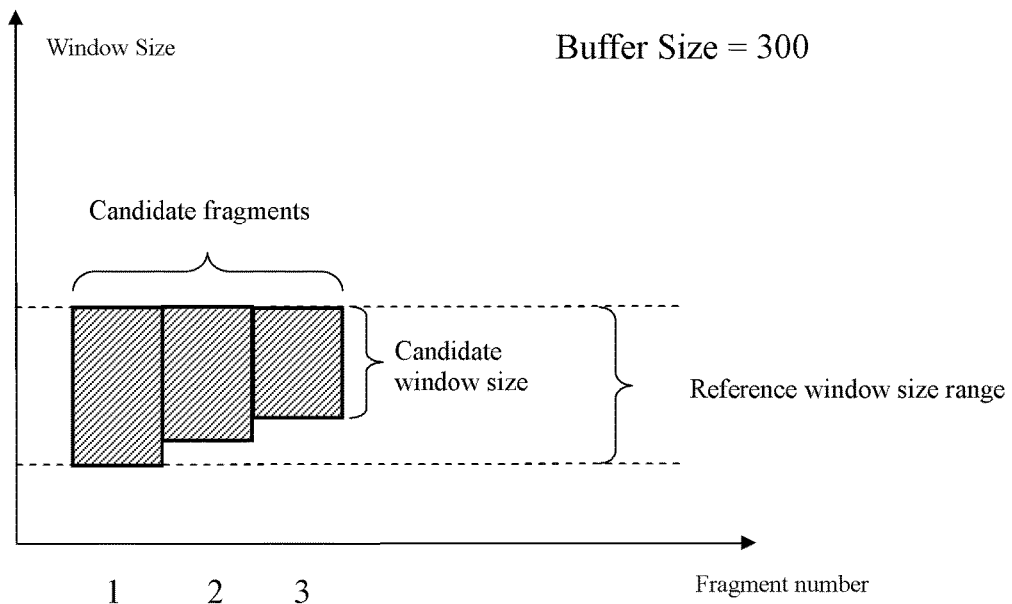
FIG. 9 is a diagram schematically illustrating an example of another intermediate result of the method for selecting consecutive RBs shown in FIG. 2.

The optional step S230 in effect further reduces the searching space in terms of the window sizes to be used for searching. As illustrated in FIG. 9, after execution of step S230, the sets of candidate window sizes corresponding to candidate fragments are reduced from [2, 12], [3, 15] and [4, 10] to [2, 12]∩[2, 10]=[2, 10], [3, 15]∩[2, 10]=[3, 10] and [4, 10]∩[2, 10]=[4, 10], respectively.

Figure 3:
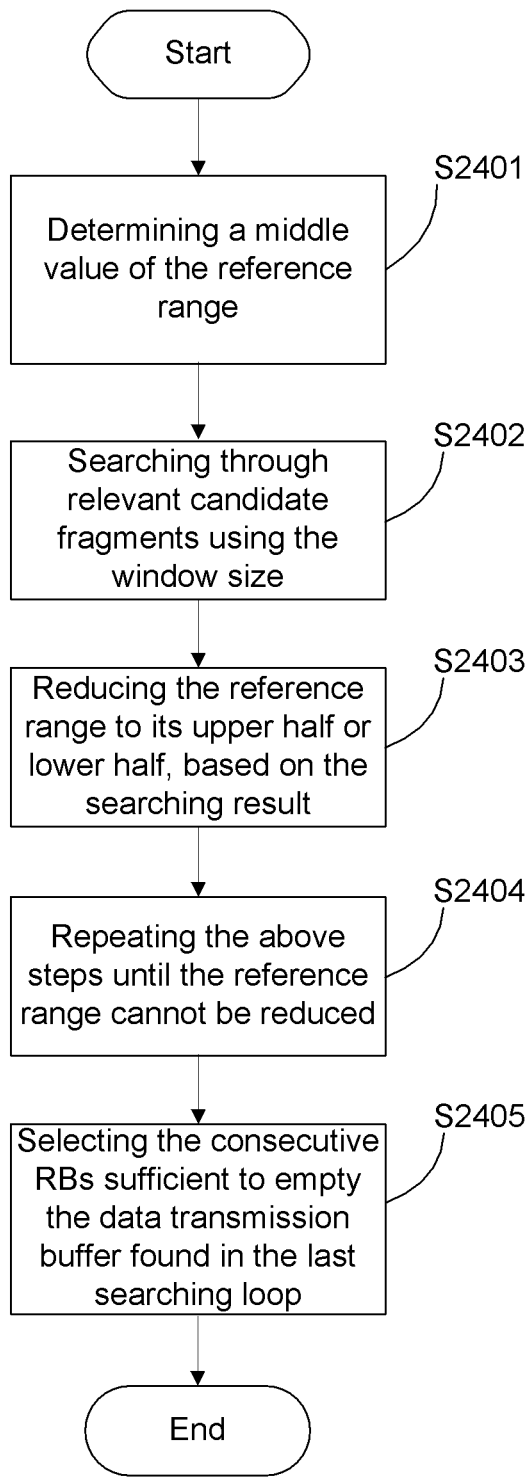
FIG. 3 is a flowchart schematically illustrating a dichotomy-based searching process according to the present disclosure.

To further reduce the complexity and thus the execution time of the searching step S240, there is also proposed a dichotomy-based searching process shown in FIG. 3.

As illustrated, initially, a middle value of the reference window size range to be used in a current searching loop is determined (S2401). Then, the candidate fragments whose window size ranges contain the determined window size are searched through using the determined middle value (S2402). If no consecutive RBs sufficient to empty the transmission buffer is found in any of the candidate fragments, the reference window size range is reduced to its upper half; otherwise, the reference window size range is reduced to its lower half (S2403). After steps S2401-S2403 are iteratively executed until the reference window size range cannot be reduced (S2404), the consecutive RBs sufficient to empty the transmission buffer found in the last searching loop is selected (S2405). After step S2405, the process is terminated.

Preferably, each of the candidate fragments is searched through from either or both of its ends, so that the number of fragments formed by FSS can be minimized.

Figure 10:
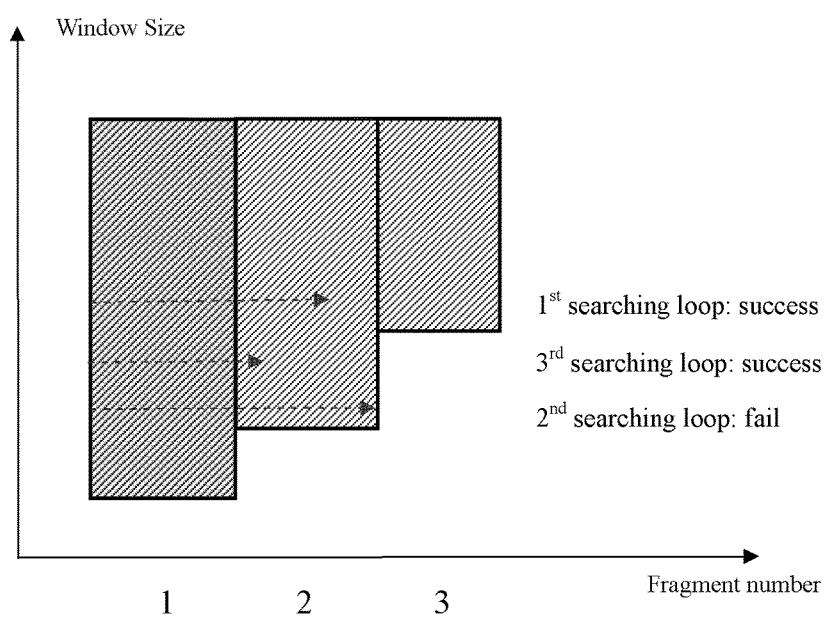
FIG. 10 is a diagram schematically illustrating an example of a detailed procedure of the dichotomy-based searching process according to the present disclosure.

Referring now to FIG. 10, the above-described dichotomy-based searching process will be described in further detail in connection with the candidate fragments and their corresponding sets of candidate window sizes presented in FIG. 9.

As illustrated in FIG. 10, initially, the middle value of the reference window size range [2, 10] to be used in the first searching loop is determined as 6. Then, the first searching loop is executed, wherein the candidate fragments 1, 2 and 3 whose window size ranges contain the determined window size 6 are searched through using the determined middle value 6. After a group of consecutive RBs sufficient to empty the transmission buffer is successfully found in candidate fragment 2, the reference window size range [2, 10] is reduced to its lower half [2, 6].

As the reference window size rage of [2, 6] can be further reduced, the middle value of the reference window size range to be used in the second searching loop is determined as 4. Then, the second searching loop is executed, wherein the candidate fragments 1 and 2 whose window size ranges contain the determined window size 4 are searched through using the determined middle value 4. After the fragments 1 and 2 have been completely searched through but no group of consecutive RBs sufficient to empty the transmission buffer can be successfully found, the reference window size range [2, 6] is reduced to its upper half [4, 6].

As the reference window size rage of [4, 6] can be further reduced, the middle value of the reference window size range to be used in the second searching loop is determined as 5. Then, the third searching loop is executed, wherein the candidate fragments 1 and 2 whose window size ranges contain the determined window size 5 are searched through using the determined middle value 5. After a group of consecutive RBs sufficient to empty the transmission buffer is successfully found in candidate fragment 2, the reference window size range [4, 6] is reduced to its lower half [4, 5].

As the reference window size range of [4, 5] cannot be further reduced, the consecutive RBs successfully found in the third searching loop is selected as the searching result.

Using the dichotomy-based searching process, the complexity and thus the execution time of the searching step can be reduced exponentially. Further, even if the step of searching has to be undesirably terminated due to time constraint, the dichotomy-based searching process may select the consecutive RBs sufficient to empty the transmission buffer found in the last searching loop as its searching result, which is much closer to the optimal searching result than that is obtained by applying the aforementioned straightforward searching process under the same time constraint.

Preferably, an RB limited case can be identified, if there is not selected any fragment whose total number of ERBs is larger than the size of the transmission buffer at step S210. In this case, instead of executing steps S220-S240, it is not only optimal but also much simpler to select all RBs on a fragment with the largest total number of ERBs for transmission of the largest amount of data stored in the transmission buffer.

Figure 4:
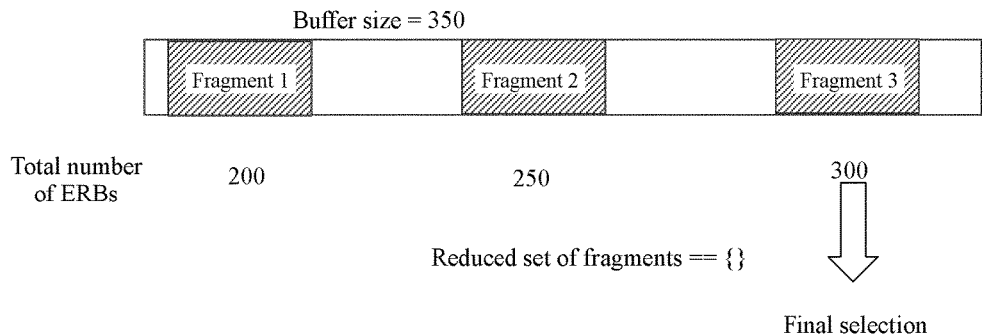
FIG. 4 is a diagram schematically illustrating the identification of the RB limited case and the corresponding RB selection criterion according to the present disclosure.

By way of example, the RB limited case and the RB selection criterion corresponding thereto is illustrated in FIG. 4. In the illustrated example, the total numbers of ERBs of fragments 1-3 are respectively 200, 250 and 300, while the size of the transmission buffer is 300. Accordingly, an RB limited case can be identified, and fragment 3 with the largest total number of ERBs is directly selected for data transmission.

Combining the identification of the RB limited case, the gradual reduction of the searching space and the dichotomy-based searching process, the proposed selection method presents a simple-to-complex characteristic enabling the process to gradually approach the optimal result over time. In other words, even if the process is forced to be terminated before obtaining the optimal result, a searching result closer to the optimal one can be obtained. This is very useful in telecommunication systems (e.g., LTE systems), which typically operate in real time and are subject to time constraints.

According to existing wireless communication standards, the number of RBs that can be allocated to a UE is typically limited to a predetermined set. For example, as provisioned in 3GPP protocols, the number of RBs that can be allocated for uplink transmission is limited to the set {1, 2, 3, 4, 5, 6, 8, 9, 10, 12, 15, 16, 18, 20, 24, 25, 27, 30, 32, 36, 40, 45, 48, 50, 54, 60, 64, 72, 75, 80, 81, 90, 96, 100, 108}. This limitation is useful to further shrink the set of window sizes to be used in the searching process.

As an enhancement, the searching process may be split into multiple processes to be carried out concurrently on multiple cores of a multi-core processor. Each process searches through a universal set of the candidate fragments using a subset of the (candidate) window sizes, through a subset of the candidate fragments using a universal set of the (candidate) window sizes, or through a subset of the candidate fragments using a subset of the (candidate) window sizes. In this manner, the searching process can be parallelized, and the time consumption can thus be reduced linearly.

Figure 11:
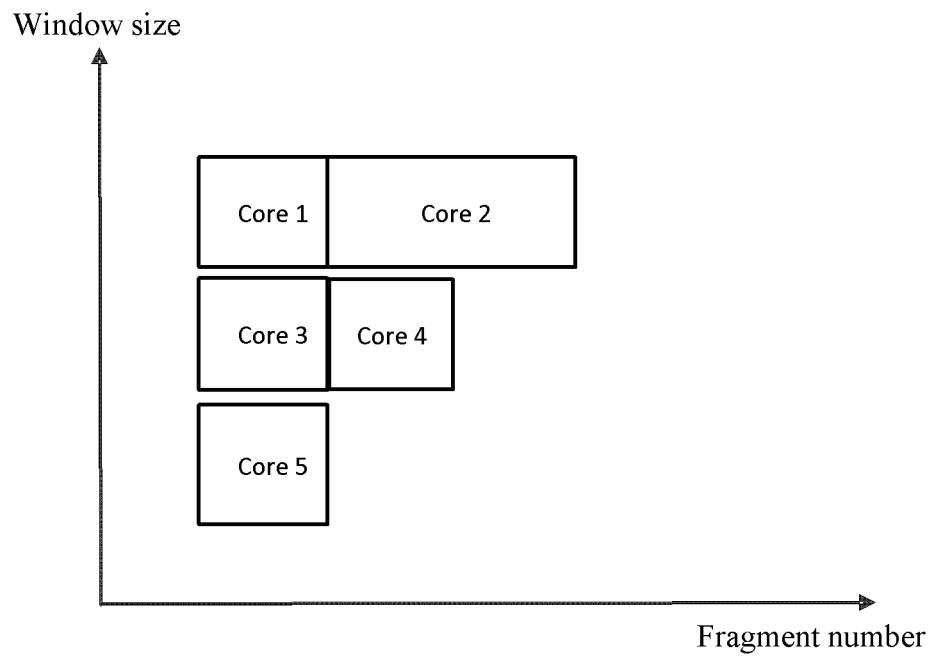
FIG. 11 is a diagram schematically illustrating a manner for splitting the searching process according to the present disclosure.
Figure 12:
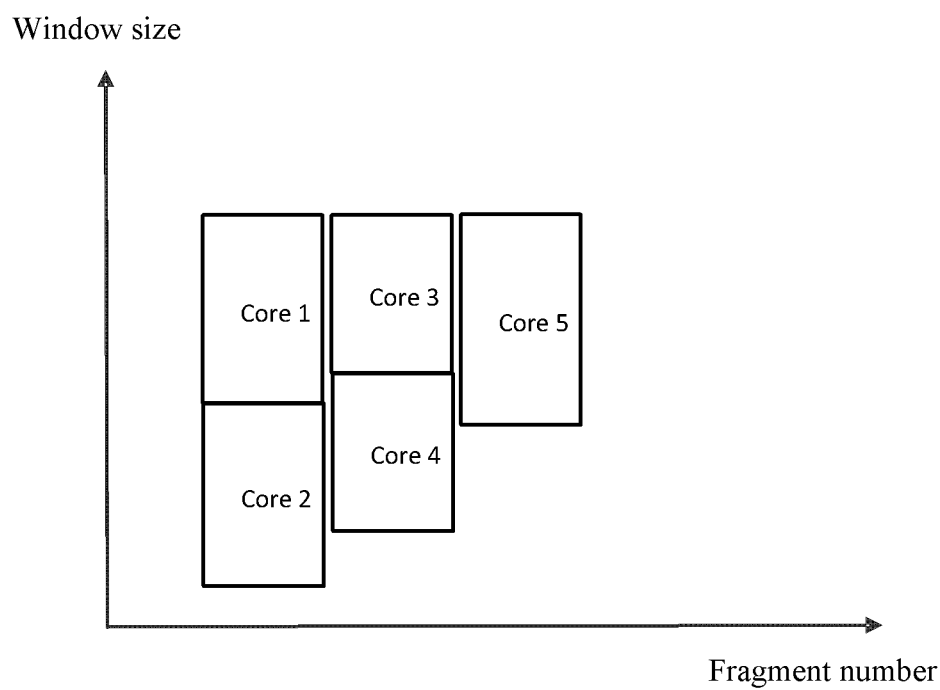
FIG. 12 is a diagram schematically illustrating another manner for splitting the searching process according to the present disclosure.

Different splitting manners may be adopted. In FIG. 11, a manner for firstly splitting the searching space with respect to window size and then with respect to fragment is illustrated. In FIG. 12, a manner for firstly splitting the searching space with respect to fragment and then with respect to window size is illustrated.

Figure 13:
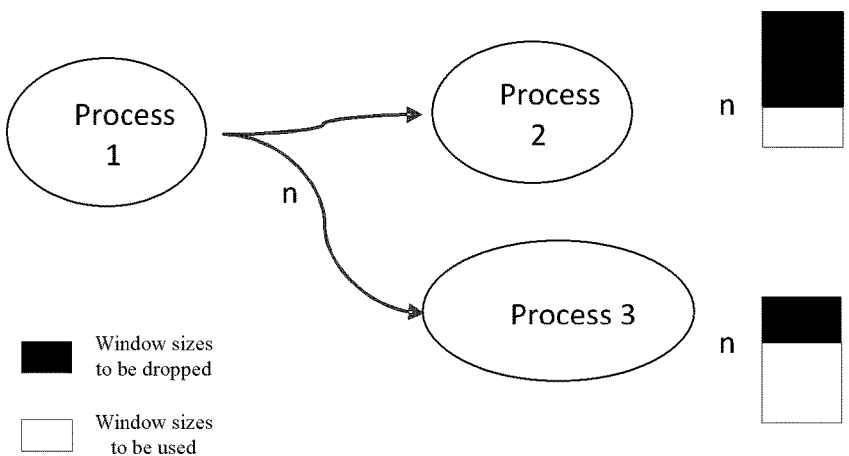
FIG. 13 is a diagram schematically illustrating how multiple cores may cooperate with each other to save processing power.

In a preferable embodiment, the multiple cores can cooperate with each other to save processing power. Specifically, as illustrated in FIG. 13, when one of the cores finds a group of consecutive RBs sufficient to empty the transmission buffer using a window size n, it notifies other cores of the window size n, so that the other cores can drop window sizes larger than n.

In case the number of the processes is larger than the number of the cores, the processes may be assigned priorities, and the cores may be allocated with the processes according to their priorities.

Figure 14:
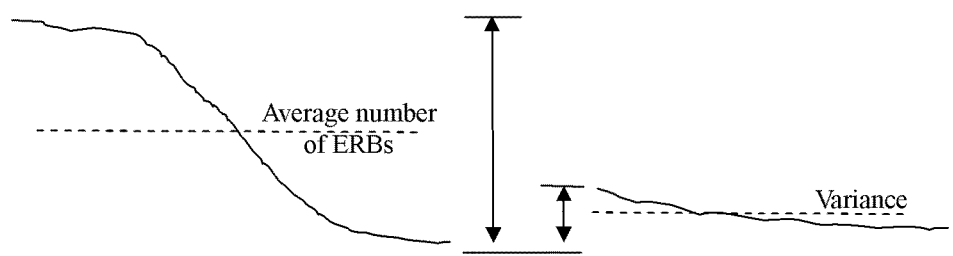
FIG. 14 is a diagram schematically illustrating two parameters useful in determining a priority for a process searching through a fragment.

By way of the example, a process searching through a fragment may be given a priority determined according to an average number of ERBs contained in each of RBs on the fragment and a variance of numbers of ERBs contained in respective RBs of the fragment. For illustration, the average number of ERBs and the variance are presented in FIG. 14.

In the following, a structure of a BS 15 according to the present disclosure will be given with reference to FIG. 15.

Figure 15:
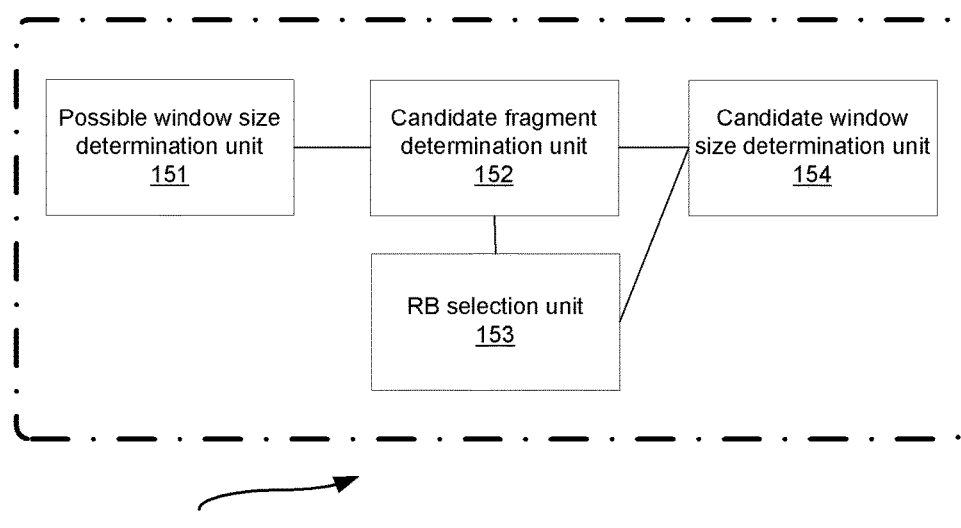
FIG. 15 is a block diagram schematically illustrating a structure of a BS according to the present disclosure.

As shown in FIG. 15, the BS 15 comprises a possible window size determination unit 151, a candidate fragment determination unit 152, and a RB selection unit 153. The possible window size determination unit 151 is configured to determine a minimum possible window size and a maximum possible window size for each of selected fragments of the frequency band. All RBs on each of the selected fragments together are sufficient to empty a transmission buffer. The candidate fragment determination unit 152 is configured to determine candidate fragments to be searched through, by defining a reference window size range by a minimum value of minimum possible window sizes of the selected fragments and a minimum value of maximum possible window sizes of the selected fragments and determining a selected fragment, whose window size range defined by its minimum possible window size and maximum possible window size intersects with the reference window size range, as one of the candidate fragments. The RB selection unit 153 is configured to search through the candidate fragments using window sizes which fall within the reference window size range to find and select a minimum number of consecutive RBs sufficient to empty the transmission buffer.

The BS 15 may further comprise a candidate window size determination unit 154 configured to determine an intersection, between the reference window size range and a window size range defined by a minimum possible window size and a maximum possible window size of each of the candidate fragments, as a set of candidate window sizes corresponding to the candidate fragment. In this case, the RB selection unit 153 is configured to search through each of the candidate fragments using the set of candidate window sizes corresponding to the candidate fragment.

Preferably, the RB selection unit 153 is configured to select all RBs on a fragment with the largest total number of ERBs for transmission of the stored data, if there does not exist any fragment whose total number of ERBs is larger than the size of the transmission buffer.

Figure 16:
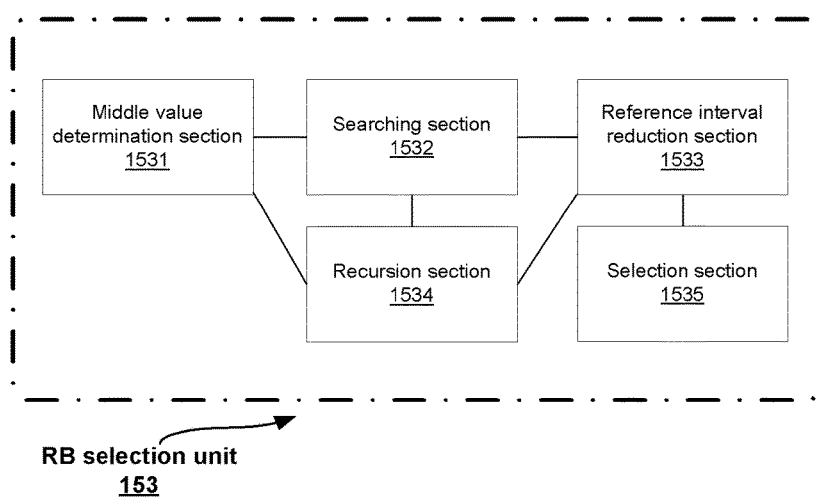
FIG. 16 is a block diagram schematically illustrating a structure of a RB selection unit included in the BS shown in FIG. 15 according to the present disclosure.

An example of the detailed structure of the RB selection unit 153 is shown in FIG. 16. As illustrated, the RB selection unit 153 comprises a middle value determination section 1531, a searching section 1532, a reference window size range reduction section 1533, a recursion section 1534 and a selection section 1535. The middle value determination section 1531 is configured to determine a middle value of the reference window size range to be used in a current searching loop. The searching section 1532 is configured to search through the candidate fragments whose window size ranges contain the determined window size, using the determined middle value. The reference window size range reduction section 1533 is configured to reduce the reference window size range to its upper half, if no consecutive RBs sufficient to empty the transmission buffer is found in any of the candidate fragments, and otherwise, reduce the reference window size range to its lower half. The recursion section 1534 is configured to repeatedly activate the above sections until the reference window size range cannot be reduced. The selection section 1535 is configured to select the consecutive RBs sufficient to empty the transmission buffer found in the last searching loop.

Preferably, the RB selection unit 153 consists of multiple RB selection sub-units operating in parallel, each of which performs a process that searches through a subset of the candidate fragments or searches using a subset of the (candidate) window sizes at a time.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method for selecting consecutive Resource Blocks (RBs) on an available frequency band, comprising:
   determining a minimum possible window size and a maximum possible window size for each of selected fragments of the frequency band, wherein all RBs on a selected fragment together are sufficient to empty a transmission buffer,
   determining candidate fragments to be searched through, by defining a reference window size range by a minimum value of minimum possible window sizes of the selected fragments and a minimum value of maximum possible window sizes of the selected fragments,
   determining a selected fragment, whose window size range defined by its minimum possible window size and maximum possible window size intersects with the reference window size range, as one of the candidate fragments; and
   searching through the candidate fragments using window sizes which fall within the reference window size range to select a minimum number of consecutive RBs sufficient to empty data stored in the transmission buffer.

2. The method according to claim 1, wherein the minimum possible window size is equal to number of RBs with the most Effective Raw Bits (ERBs) which are sufficient to empty the transmission buffer, and the maximum possible window size is equal to number of RBs with the least ERBs which are sufficient to empty the transmission buffer.

3. The method according to claim 1, further comprising:
determining an intersection, between the reference window size range and a window size range defined by a minimum possible window size and a maximum possible window size of each of the candidate fragments, as a set of candidate window sizes corresponding to the candidate fragment, and
wherein each of the candidate fragments is searched through using the set of candidate window sizes corresponding to the candidate fragment.

4. The method according to claim 1, further comprising:
selecting all RBs on a fragment with a largest total number of Effective Raw Bits (ERBs) for transmission of the stored data, if there does not exist any fragment whose total number of ERBs is larger than the size of the transmission buffer.

5. The method according to claim 1 wherein the step of searching comprises:
determining a middle value of the reference window size range to be used in a current searching loop;
searching through the candidate fragments whose window size ranges contain the determined window size, using the determined middle value;
if no consecutive RBs sufficient to empty the transmission buffer is found in any of the candidate fragments, reducing the reference window size range to its upper half; otherwise, reducing the reference window size range to its lower half;
repeating the above steps until the reference window size range cannot be reduced; and
selecting the consecutive RBs sufficient to empty the transmission buffer found in the last searching loop.

6. The method according to claim 1, wherein the step of searching is split into multiple processes to be carried out concurrently on multiple cores of a multi-core processor, and each process searches through a subset of the candidate fragments or each process searches using a subset of the window sizes.

7. The method according to claim 3, wherein the step of searching is split into multiple processes to be carried out concurrently on multiple cores of a multi-core processor, and each process searches through a subset of the candidate fragments or each process searches using a subset of the candidate window sizes.

8. A base station, comprising:
a possible window size determination unit configured to determine a minimum possible window size and a maximum possible window size for each of selected fragments of a frequency band, wherein all Resource Blocks (RBs) on a selected fragment together are sufficient to empty a transmission buffer;
a candidate fragment determination unit configured to determine candidate fragments to be searched through, by defining a reference window size range by a minimum value of minimum possible window sizes of the selected fragments and a minimum value of maximum possible window sizes of the selected fragments;
determining a selected fragment, whose window size range defined by its minimum possible window size and maximum possible window size intersects with the reference window size range, as one of the candidate fragments; and
a RB selection unit configured to search through the candidate fragments using window sizes which fall within the reference window size range to find and select a minimum number of consecutive RBs sufficient to empty the transmission buffer.

9. The base station according to claim 8, wherein the minimum possible window size is equal to the number of RBs with the most Effective Raw Bits (ERBs) which are sufficient to empty the transmission buffer, and the maximum possible window size is equal to the number of RBs with the least ERBs which are sufficient to empty the transmission buffer.

10. The base station according to claim 8, further comprising:
a candidate window size determination unit configured to determine an intersection, between the reference window size range and a window size range defined by a minimum possible window size and a maximum possible window size of each of the candidate fragments, as a set of candidate window sizes corresponding to the candidate fragment, and
wherein the RB selection unit is configured to search through each of the candidate fragments using the set of candidate window sizes corresponding to the candidate fragment.

11. The base station according to claim 8, wherein the RB selection unit is configured to select all RBs on a fragment with a largest total number of Effective Raw Bits (ERBs) for transmission of the stored data, if there does not exist any fragment whose total number of ERBs is larger than the size of the transmission buffer.

12. The base station according to claim 8, wherein the RB selection unit comprises:
a middle value determination section configured to determine a middle value of the reference window size range to be used in a current searching loop;
a searching section configured to search through the candidate fragments whose window size ranges contain the determined window size, using the determined middle value;
a reference window size range reduction section configured to reduce the reference window size range to its upper half, if no consecutive RBs sufficient to empty the transmission buffer is found in any of the candidate fragments, and
otherwise, reduce the reference window size range to its lower half;
a recursion section configured to repeatedly activate the above sections until the reference window size range cannot be reduced; and
a selection section configured to select the consecutive RBs sufficient to empty the transmission buffer found in the last searching loop.

13. The base station according to claim 8, wherein the RB selection unit consists of multiple RB selection sub-units operating in parallel, each of which performs a process that searches through a subset of the candidate fragments or searches using a subset of the window sizes at a time.

14. The base station according to claim 10, wherein the RB selection unit consists of multiple RB selection sub-units operating in parallel, each of which performs a process that searches through a subset of the candidate fragments or searches using a subset of the candidate window sizes at a time.

* * * * *